Nov. 29, 1927.
E. S. PRESTON
1,650,999
ELECTRICALLY HEATED UTENSIL
Filed May 19, 1927
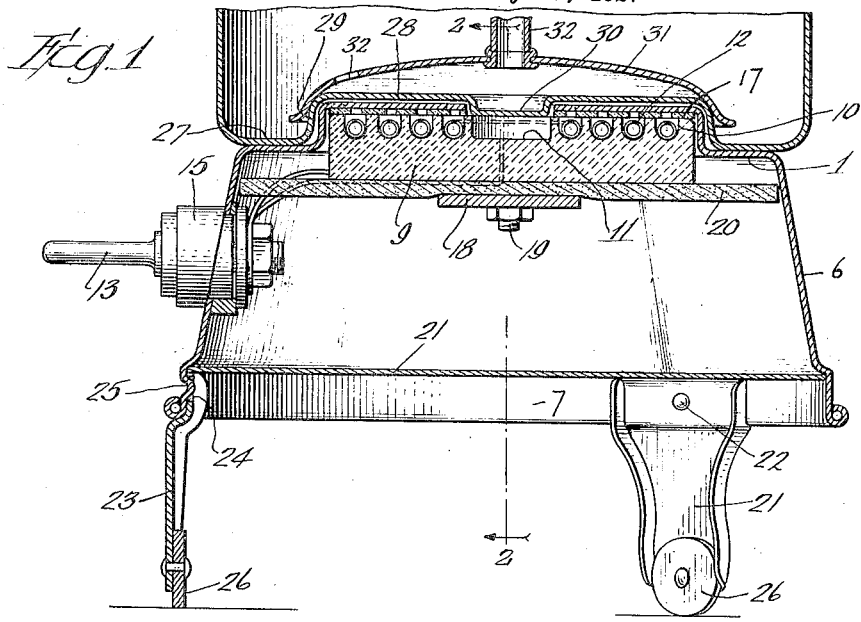
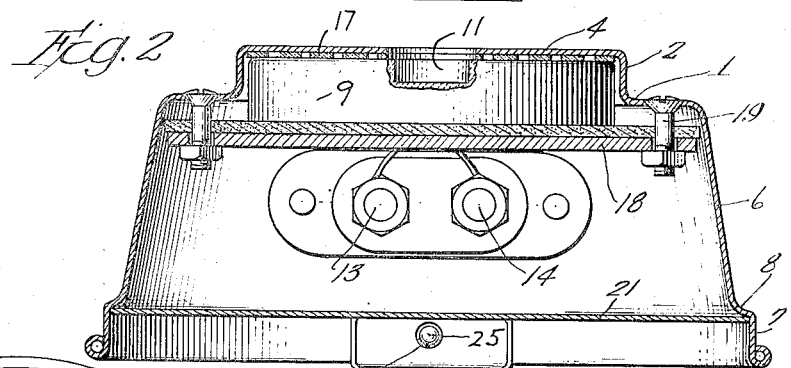
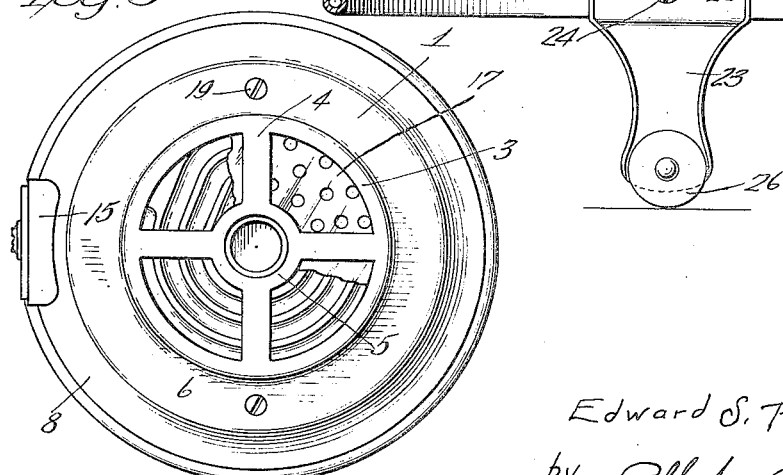
Inventor
Edward S. Preston
by Albert Scheible
Atty.

Patented Nov. 29, 1927.

1,650,999

UNITED STATES PATENT OFFICE.

EDWARD S. PRESTON, OF CHICAGO, ILLINOIS, ASSIGNOR TO CHICAGO ELECTRIC MANUFACTURING COMPANY, OF CHICAGO, ILLINOIS, A CORPORATION OF ILLINOIS.

ELECTRICALLY-HEATED UTENSIL.

Application filed May 19, 1927. Serial No. 192,524.

My invention relates to electrically heated cooking apparatus, and more particularly to the class of such apparatus in which the electric heating unit is contained in a base unit and in which the cooking utensil is detachably seated on this base unit when in use.

Generally speaking, my invention aims to provide cooking apparatus of this general class, in which the top of the base unit and the bottom of the cooking utensil have relatively interfitting formations for holding the utensil in a definite position on the base unit while permitting the utensil to seat on the top of the base unit so as to prevent the passage of air between them. My invention also aims to provide the utensil with a further bottom formation which will prevent a buckling of the utensil bottom when heated, aims to provide the top of the base unit with a recess for receiving this buckle-preventing formation on the utensil, and aims to dispose the heating member of the base unit so that this buckle-preventing formation on the utensil will be exposed to the direct heating action of a part of the heating member. Furthermore, my invention aims to provide a novel and inexpensive mounting for the heating member.

More particularly, my invention relates to an electric percolator embodying the above recited features, and aims to dispose a base interfitting bottom formation of the percolator so that this will also serve as a self-centering seat for the basal percolator cup of the percolator.

Still further and also more detailed objects will appear from the following specification and from the accompanying drawings, in which Fig. 1 is a central and vertical section through the base unit and through the lower portion of the percolator of an electric coffee percolator embodying my invention.

Fig. 2 is a central and vertical section through the base unit alone, taken at right angles to the section of Fig. 1.

Fig. 3 is a reduced plan view of the base unit, with a part of the mica disk cut away and with the resistance wire omitted.

In the embodiment of the drawings, the base unit includes a body of inverted cup shape which has at its top and outer and horizontal annular portion 1 connected by a tubular riser portion 2 to a more elevated flat flange 3. This ring is spanned by a spider consisting of radial arms 4 connecting a relatively small and flat inner ring 5, as shown in Fig. 3. The side wall of the inverted cup shaped body comprises an upper portion 6 surmounting a larger diametered and approximately cylindrical lower portion 7, which two portions are connected by an annular shoulder portion 8.

Extending upwardly into the bore of the tubular riser portion 2 (and desirably fitting this bore) is a disk-shaped insulator 9 which has a spiral groove 10 formed in its upper face around a central recess 11. A high resistance wire 12, desirably in the form of a coil, extends through the spiral groove and through suitable perforations in the insulator 9 to wire terminals 13 and 14, which terminals extend through insulating bushings 15 mounted in the lateral base portion 16.

A perforated mica disk 17 is disposed above the top of the insulator 9 so as to space this disk from the inner ring portion 5, the arms 4 and the flat flange 3 of the top of the base unit. To hold the insulator 9 in position, I support it by a metal bar 18 which underhangs the insulator 9, which bar is connected to the top portion 2 by bolts 19. I also desirably interpose a sheet 20 of asbestos between the supporting cross-bar 18 and the insulator 9, which asbestos sheet extends close to the bore of the lateral wall portion 6 so as to retard the downward radiation of heat from the heating member. To retard this downward heat radiation still further, I also provide a bottom plate 21, which may be a thin sheet metal disk and which is held within the bore of the said base unit body by the legs of the base unit.

For this latter purpose, I desirably support the inverted cup-shaped body by three legs, namely two legs 21 (each of which is secured to the said body by a rivet 22) and a third leg 23 which is fast upon the bottom plate 21, this third leg being illustrated as formed integral with the said bottom plate. Each of the legs 22 is fastened to the body in such a position as to have its upper end spaced from the annular shoulder 8 by a distance approximating the thickness of the bottom plate 21. The third leg 23 is provided near its top with a perforation 24 for receiving an inwardly directed nub 25 on the cylindrical body portion 7. With the parts thus constructed, the bottom plate 21 can be slipped into the bore of the body to insert edge portions of this bottom plate between the tops of the two legs 22 and the said annular shoulder 8. When the bottom plate is then pressed upwardly, the metal of the body will yield sufficiently to permit the nub 25 to snap into the perforation 24 on the third leg 23, thereby latching the bottom plate in the position shown in Fig. 1. Each of the three legs also desirably has an insulating foot secured to and projecting downwardly beyond its lower end, such as a fibre washer 26, to prevent heat radiation through the legs to the table on which my electrically heated appliance is used.

The cooking (or other) utensil to be used with my above described heating unit has a bottom comprising an outer annular part 27 adapted to seat flatwise on the part 1 of my base body, and an elevated central portion 28 which is generally flat and slightly larger in diameter than the flat flange 3 of the base body. This central portion 28 is connected to the inner edge of the annular part 27 by a tubular riser portion 29 which fits over the tubular riser 2 of the base body, thereby preventing the utensil from moving laterally with respect to the base unit. The riser portion 29 may be somewhat taller than the tubular riser 2, as shown in Fig. 1, thereby permitting the part 27 to seat on the part 1 so as to exclude air.

If the elevated bottom portion 28 was formed substantially flat in its entirety, the heating of this would cause it to bulge and distort. To avoid this, I form a central and downwardly projecting boss 30 on the utensil bottom, which boss extends downwardly through the ring 5 of the body top and the bore of the mica disk 17 in alinement with the recess 11 in the insulator 9 of the heating member. This boss formation effectively stiffens the utensil bottom against buckling and also presents an increased area to direct radiation from the top of the insulator 9, which insulator top is heated by the high resistance wire.

With a coffee percolator, I also employ the upwardly formed bottom formation as means for supporting and centering a downwardly open inverted cup 31 which carries and opens into the usual pump tube 32. This cup 31 seats on the juncture of the tubular riser 29 with the flat bottom portion 28, and the cup 31 can terminate somewhat above the more outward bottom portion 27, as shown in Fig. 1. By providing a suitable water inlet, such as a perforation 32 in the cup 31, I cause this cup to co-operate with the utensil bottom portion below it in affording a shallow chamber which houses a quite small amount of water directly over the heating unit. Consequently, this small amount of water is subjected to an intense heating effect, thereby expediting the vaporization. However, this provision does not interfere with the easy cleaning of the pump cup and the percolator bottom, as the cup can instantly be lifted off its normal seating position of Fig. 1.

By arranging the parts as above described, I secure an exceedingly simple, cheaply manufactured and efficient construction. Moreover, the asbestos sheet 20 and the air space between this and the bottom plate 21 combine in screening the heat from the table on which the base unit is used, so that these parts co-operate in confining the heat for the intended purpose and in permitting my appliance to be used on ordinary tables without affecting the varnish on the latter.

However, while I have illustrated and described my invention in an embodiment including a coffee percolator, I do not wish to be limited to its use in connection with any particular utensils, since various utensils with similarly formed bottoms can be used interchangeably with the same base unit. Neither do I wish to be limited to the details of the construction and arrangement above described, as many changes can obviously be made without departing either from the spirit of my invention or from the appended claims.

I claim as my invention:

1. A utensil heating appliance comprising an inverted cup-shaped body, a heating member supported within and adjacent to the top of the body, a bottom member extending across the bore of the body at some distance below the heating member; and legs jointly supporting the body and the bottom member, one of the legs being fast upon the bottom member and yieldingly latched to the body, other legs being permanently secured to the body and having their tops underhanging the bottom member.

2. A utensil heating appliance as per claim 1, in which the body has a shoulder formation overhanging and adjacent to the parts of the bottom member which are adjacent to the tops of the said other legs.

3. A utensil heating appliance comprising an inverted cup-shaped body, a heating member supported within and adjacent to the top of the body, a bottom member extending across the bore of the body at some distance below the heating member; and legs jointly supporting the body and the bottom member, one of the legs having a perforation and the body having a nub extending into the said perforation to latch that leg releasably to the body, other legs being permanently secured to the body and having their tops underhanging the bottom member.

4. Heating apparatus comprising a heating unit having a raised central top portion and a central perforation in the said raised top portion, and having a flat annular top portion radially outward of the said raised portion; and a utensil having its bottom formed to afford a flat annular portion seating on the annular top portion of the heating unit, a raised inner portion overhanging the raised top portion of the heating unit, and a downwardly directed central boss extending into the said central perforation.

5. A heating apparatus as per claim 4, in which the raised top portion of the heating unit has perforations surrounding the central perforation, and in which the heating unit includes a heat insulator underhanging its raised top portion and a resistance wire mounted on the insulator and underhanging the said surrounding perforations.

6. Heating apparatus comprising a heating unit having a raised central top portion and a central perforation in the said raised top portion, and having a flat annular top portion radially outward of the said raised portion; and a utensil having its bottom formed to afford a flat annular portion seating on the annular top portion of the heating unit, a raised inner portion overhanging the raised top portion of the heating unit, and a downwardly directed central boss extending into the said central perforation; the heat insulator having a recess underhanging the said central perforation and into which the said boss extends.

7. A utensil heating appliance comprising a body having a central raised portion surrounded by a less elevated annular flat top portion and connected to the latter by a vertical tubular portion, the said raised portion including a central flat ring and a plurality of arms connecting the said ring with the tubular portion; a heat insulator supported by the body and having a grooved top adjacent to and below the raised portion, with the grooves therein extending under the spaces between the said arms, and a high resistance wire extending through the said grooves.

8. A utensil heating appliance as per claim 7, including a heat-insulating disk disposed between the top of the said insulator and the said raised portion, the said disk having perforations alining vertically with the said grooves.

Signed at Chicago, Illinois, May 14th, 1927.

EDWARD S. PRESTON.